UNITED STATES PATENT OFFICE.

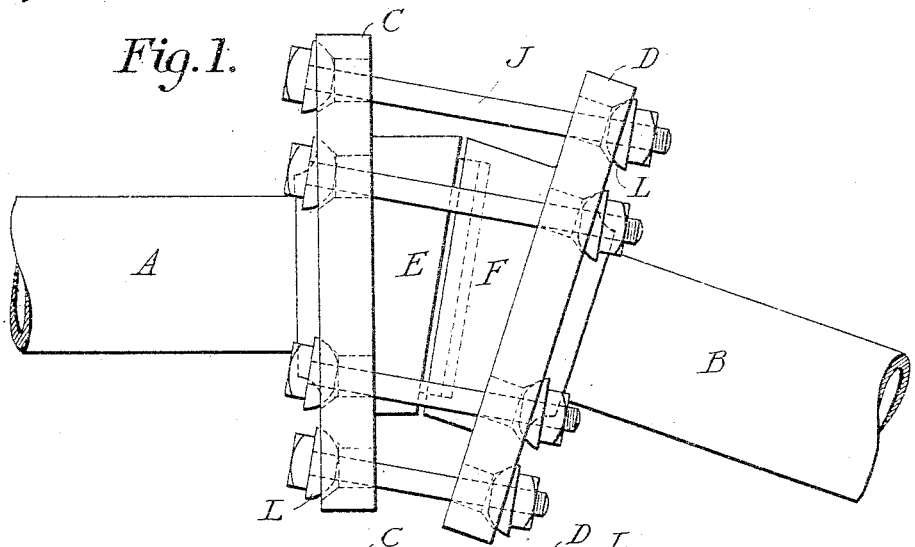
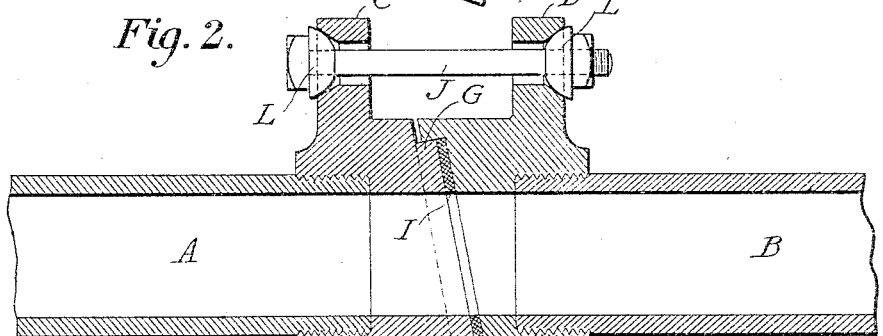
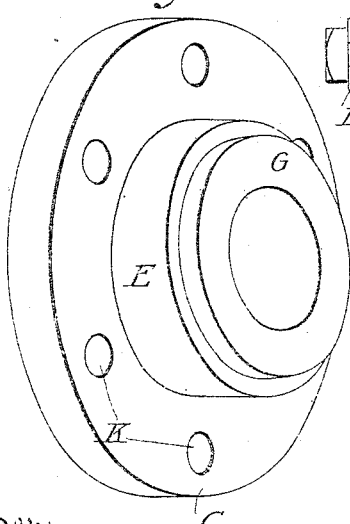
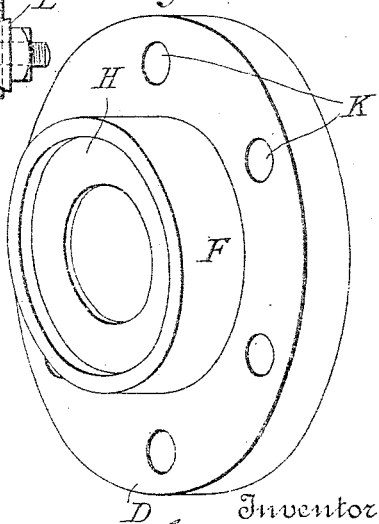

CLINTON GUYER, OF MUNCY, PENNSYLVANIA, ASSIGNOR OF ONE-HALF TO WILLIAM C. CRAWFORD, OF MUNCY, PENNSYLVANIA.

PIPE-COUPLING.

960,899.     Specification of Letters Patent.     Patented June 7, 1910.

Application filed August 12, 1909. Serial No. 512,602.

*To all whom it may concern:*

Be it known that I, CLINTON GUYER, a citizen of the United States, residing at Muncy, in the county of Lycoming and State of Pennsylvania, have invented certain new and useful Improvements in Pipe - Couplings; and I do hereby declare the following to be a full, clear, and exact description of the invention, such as will enable others skilled in the art to which it appertains to make and use the same.

This invention relates to pipe couplings or unions for connecting sections of piping at different angles, and is an improvement over that type of coupling in which contiguous pipe-sections are provided with flanges having inclined faces and bolted or clamped together with an interposed gasket or gaskets. Such couplings as heretofore constructed depend upon the clamping bolts for holding the pipes in registration or alinement, and in adjusting at different angles there is apt to be more or less derangement of the flanges and imperfect registration of the bores of the pipe, with consequent liability of leakage and also contraction of the fluid passage. Another point of weakness is the impossibility of holding the gasket between the faces of the flanges under high pressure, it being a well known fact that pressure will displace the gasket or force it between the bolts.

The object of this invention is to provide a practical and efficient coupling of the above stated character, in which permanent registration of the pipes will be maintained and displacement of the gasket prevented, without further duty of the bolts than to clamp the parts together, thus obviating the difficulties mentioned. Such object is attained by means substantially as illustrated in the accompanying drawings, which are to be taken as a part of this specification and in which:

Figure 1 is a side elevation of a pipe coupling embodying my invention. Fig. 2 is a central longitudinal section thereof. Figs. 3 and 4 are perspective face views of the parts of the coupling.

An explanation of the illustrated coupling is as follows: The ends of adjacent pipe couplings A and B are provided with pipe flanges C and D, on the inner faces of which are central tubular bosses, E and F. Said bosses have their ends cut obliquely to their axes to form inclined abutting faces. The bosses are formed as male and female members for an interfitting connection; one preferably having its end reduced to form a circular projection G, and the other having in its face a circular recess H in which is seated an annular flat packing ring or gasket I; the male projection G fitting revolubly in said recess and abutting against said gasket. Thus the flanges may be turned to permit relative angular adjustment of the bosses one on the other, which adjustment will vary the axes of the pipe flanges from coincidence or true alinement to various angles with the limit allowed by the degree of inclination of the faces of the bosses, thus determining the angle at which the pipe sections may be coupled. Bolts J are provided for clamping the flanges together, and a series of bolt holes K therefor in each flange, those in the two flanges arranged to register, so that the flanges can be turned one relatively to the other and secured together at angles determined by the spacing of the bolt holes. By this construction, perfect registration of the bores of the pipe is maintained at all times, both in making adjustments and when the pipes are coupled either in alinement or at any angle within the limits allowed; and the gasket being held in the recess H is secured against displacement or forcing out by compression, the bolts being relieved of all duty except to clamp the parts together. Thus the liability of leakage is prevented and a permanent steam tight joint assured.

A pair of coupling bolts would answer under many conditions, though a full complement of bolts, according to the number of bolt holes, would ordinarily be preferable especially where the pipes are used for fluid pressure or where the coupling is apt to be subjected to torsional, shearing or other strains. In view of the different angular adjustment permitted, the bolt holes should of course be of larger diameter than the bolts and either wedge-shaped washers or washers L having convex or rounded bases may be interposed between the boltheads and fastening nuts to provide flat bearing surfaces for the latter at all times.

Other clamping means than bolts may be employed if desired.

What I claim as my invention and desire to secure by Letters Patent is:

A pipe-coupling comprising a pair of pipe-flanges, each pipe being provided on its outer face with an outstanding boss, the terminating face of each boss being oblique to its axis, the oblique face of one boss being provided with an annular recess, a gasket seated therein, and the oblique face of the other boss having a round projection fitting revolubly in said recess and against said gasket, the rotation of either flange relative to the other constituting an angular adjustment which varies the axes of the pipe-flanges, and means for clamping said pipe-flanges together.

In testimony whereof I affix my signature, in presence of two witnesses.

CLINTON GUYER.

Witnesses:
D. W. BUFFINGTON,
DAVID H. GUNDRUM.